March 23, 1965 A. L. McCOY 3,174,403
HYDRAULIC SERVO CONTROL MECHANISM
Filed Oct. 26, 1959 3 Sheets-Sheet 1

ALVA L. McCOY
INVENTOR.

BY

ATTORNEY

March 23, 1965  A. L. McCOY  3,174,403
HYDRAULIC SERVO CONTROL MECHANISM
Filed Oct. 26, 1959  3 Sheets-Sheet 2

ALVA L. McCOY
INVENTOR.

BY
ATTORNEY

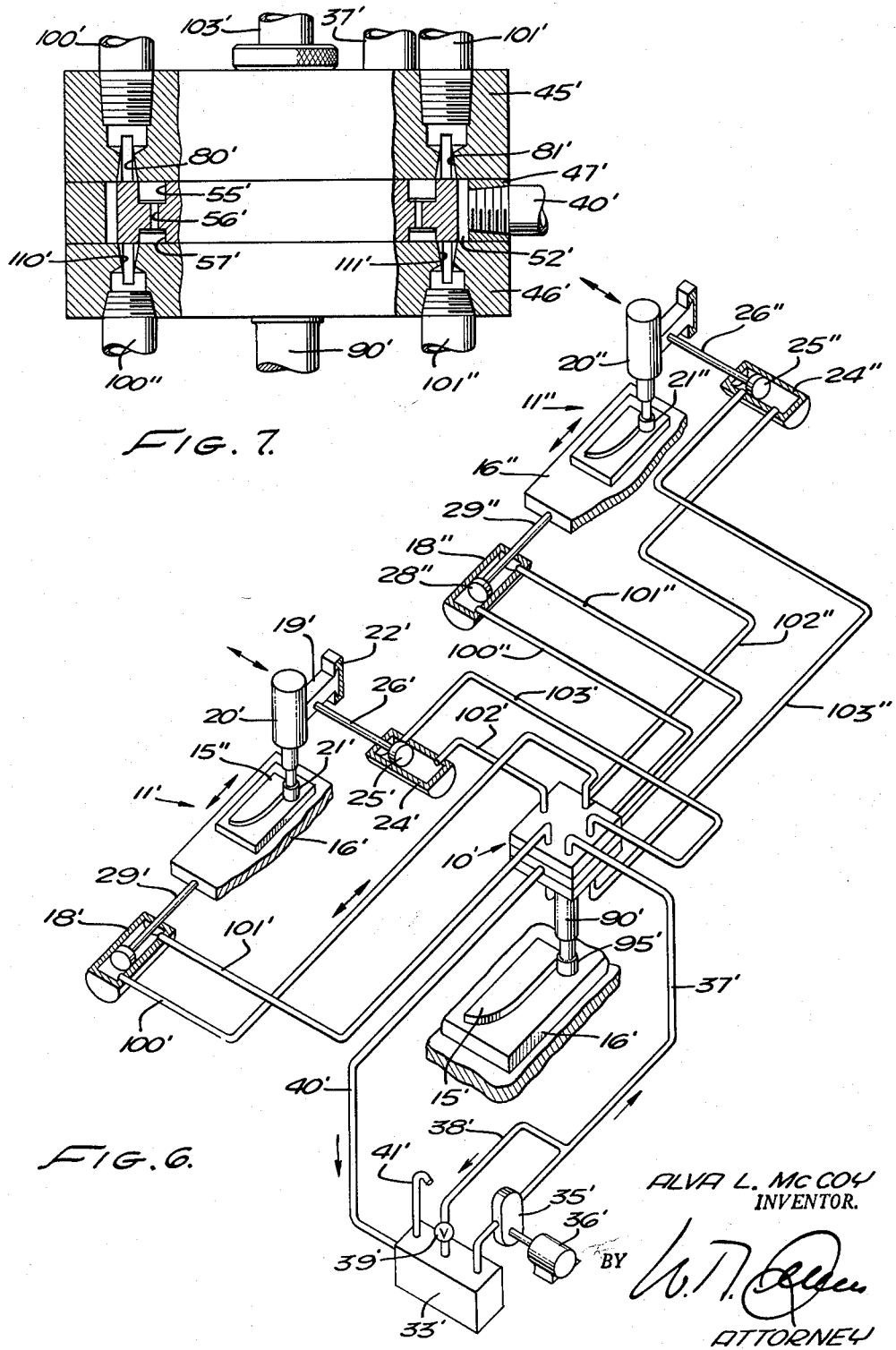

United States Patent Office

3,174,403
Patented Mar. 23, 1965

3,174,403
HYDRAULIC SERVO CONTROL MECHANISM
Alva L. McCoy, Alhambra, Calif., assignor to Young
Spring & Wire Corporation, Detroit, Mich., a corporation of Michigan
Filed Oct. 26, 1959, Ser. No. 848,656
17 Claims. (Cl. 90—13.5)

This invention relates to hydraulic control mechanisms and more particularly to hydraulic servo mechanisms utilizing a single master control of simplified and unique design to control in unison a plurality of slave follower devices from a common source of pressurized hydraulic fluid and with full assurance that each follower device will be constrained to move in unison with each other slave follower and with the master control. The control mechanism of this invention is of general application but is shown by way of illustration to control a plurality of independently driven milling cutters to provide a plurality of identical copies from a master pattern. However, it is pointed out that the system is equally applicable to other operating environments, as for example, in fire control apparatus to synchronize and harmonize the movement of universally supported guns, or to control a plurality of search antennas.

The present invention constitutes a continuation-in-part and is closely related to my co-pending applications for United States Letters Patent, Serial No. 658,720, filed May 13, 1957, now Patent No. 3,008,456 entitled Master Control Valve for Multiple Hydraulic Circuits, and to application for Letters Patent, Serial No. 725,604, filed April 1, 1958, entitled Hydraulic Control Mechanism. The present invention is particularly close to and represents a simplification of the construction shown in the later filed of the above applications. The construction shown herein eliminates many of the parts and the close tolerances involved in the construction disclosed in the latter application and provides simple, reliable and highly effective means for subjecting the opposite faces of the master control valve to the system pressure to the end that the valve is instantly responsive to the slightest touch to change the position of the control valve and thereby the flow conditions in the hydraulic actuating circuits. A particular feature of the present invention is the capability of the master control valve to control a plurality of independent slave follower devices with complete assurance that each will move faithfully in unison with the master control and without the possibility of getting out of step with one another or with the master.

Many efforts have been made to achieve the foregoing and the like objectives but not successfully prior to the present invention. Such prior attempts seeking to utilize a single master valve to control separate slave follower assemblies have endeavored to do so by connecting these assemblies in parallel with one another on the power actuating side of the master valve. However, any slight difference in the resistance to movement of a component of the separate slave follower devices unavoidably results in the unequal distribution of the pressurized fluid in the hydraulic circuits and the inevitable disproportionate movement of the separate devices sought to be controlled in unison. Such an eventuality is rendered impossible by the present control system since all slave follower devices are supplied with equal quantities of fluid at constant pressure from a common supply source and are therefore locked in synchronous operating relationship.

A further feature of the present invention is the provision of an unusually simple master control assembly utilizing a single unitary flow control valve rigidly secured to a combined sensing and actuating member. Another feature of the simplified control valve is an arrangement for floating this flow control valve in fluid maintained at constant pressure whereby the control member is responsive to the slightest touch notwithstanding the fact that it is effective to control the operation of massive and powerful slave follower components.

Still another feature of the invention is the use of simple, flexible and highly effective sealing means between the master control unit housing and the movable flow control member.

Accordingly, it is a primary object of the present invention to provide an improved servo control system utilizing a highly sensitive and responsive master control operable to control either single or multiple slave follower devices in precise unison with one another and with the master control.

Another object of the invention is the provision of an improved tracer control mechanism for use with machine tools wherein a master tracer positioned in operative relationship to a master pattern is effective to control automatically a plurality of milling machines in a manner to produce simultaneously a corresponding number of articles corresponding precisely with the master pattern.

Another object of the invention is the provision of a master control connected to a common source of pressurized hydraulic fluid and operable to control a plurality of slave follower systems structurally and mechanically independent of one another but maintained locked in operating synchronism by pressurized fluid supplied under the control of the master control unit.

Another object of the invention is the provision of an improved and greatly simplified master control having a pressure balanced unitary control member effective to control either single or multiple slave follower systems with high precision.

Another object of the invention is the provision of a master control assembly for operating remotely positioned slave follower devices and featuring a single control valve member effective to prevent all flow of pressurized fluid only when the valve element is in a neutral position thereof and operable to permit some fluid flow when moved in any linear direction from said neutral position within a predetermined plane.

Another object of the invention is the provision of a master control valve for operating remotely positioned slave follower devices and featuring a fluid control chamber having similar opposed walls floatingly supporting therebetween a single unitary control member having its opposite faces subject to identical fluid pressures and movable from a neutral position wherein all fluid flow is cut off to any of an infinite number of other positions in all of which fluid flow takes place but in different directions and at different rates.

These and other more specific objects will appear upon reading the following specification and claims and upon considering in connection therewith the attached drawings to which they relate.

Referring now to the drawings in which preferred embodiments of the invention are illustrated:

FIGURE 6 is a schematic view similar to FIGURE 1 of a second preferred embodiment of the invention wherein a single master control unit is employed to control simultaneously duplicate slave follower devices; and FIGURE 7 is a vertical sectional view corresponding to FIGURE 3 through a modified embodiment of the master control valve.

Figures 1, 2, 5:
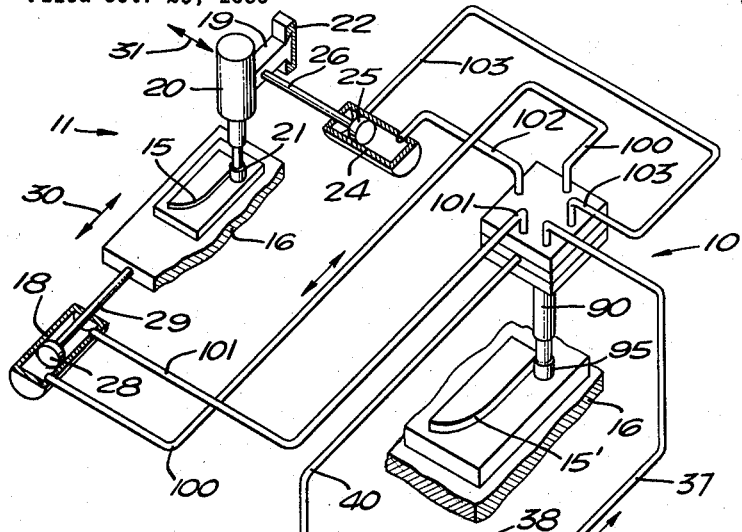
FIGURE 1 is a schematic representation of one preferred embodiment of the present invention wherein the master control unit is illustrated by way of example in such manner as to follow the contour of a master pattern to control the milling cutter of a machine tool to produce a workpiece duplicating the master pattern.
FIGURE 2 is a front elevational view of the master control unit.
FIGURE 5 is a similar view looking in the opposite direction and taken along line 5—5 on FIGURE 3.

Referring more particularly to FIGURE 1, there is illustrated one preferred embodiment of the invention having a master control assembly 10 coupled by suitable hydraulic ducting to a slave follower device designated generally 11, the entire system being supplied with pressurized hydraulic fluid from a supply source designated generally 12. As herein shown by way of example, the servo control system provided by the connected subassemblies 10, 11, 12 is incorporated in a machine tool effective to machine a faithful reproduction 15 of a master pattern 15', both being rigidly secured to the movably supported bed 16 of a machine tool of any suitable construction. It will be understood that bed 16 is supported for to and fro movement along accurately formed ways under the control of hydraulic cylinder 18 of slave follower device 11. It is further pointed out that master control assembly 10 is adapted to be rigidly mounted for movement along with the slidably supported arm 19 mounting motor 20 driving milling cutter 21. In accordance with customary practice, rigid arm 19 is slidably supported for movement at right angles to a slideway formed in the rigid upright portion 22 of the machine tool frame.

Slave follower device 11 includes similar hydraulic cylinders 18 and 24 rigidly supported with their axes in the same plane but at right angles to one another, cylinder 24 having a piston 25 connected by rod 26 to move motor supporting arm 19 to and fro in a path at right angles to the movement of the workpiece supporting bed 16 as is indicated by double headed arrow 31. Likewise, cylinder 18 contains a piston 28 connected by a piston rod 29 to bed 16 and is operable to move the bed to and fro in the direction indicated by the double headed arrow 30. The opposite ends of slave cylinders 18 and 24 are connected to the master control valve through flexible hoses which will be described presently.

The source of pressurized hydraulic fluid 12 includes a storage tank 33 having an outlet pipe 34 leading to a high pressure pump 35 driven by a motor 36. The pump outlet is connected through conduit 37 to the master control valve and includes a by-pass return branch 38 to tank 33 having therein an automatic pressure relief valve 39 functioning to maintain the pressure in conduit 37 constant at all times. Fluid released from the slave cylinders returns to tank 33 through return line 40 and the master control valve. Tank 33 also includes a vent pipe 41 opening its upper end to the atmosphere.

Referring now more particularly to FIGURES 2 to 5, the main housing of master control valve 10 will be seen to comprise an upper end plate 45 and a lower end plate 46 held separated by a rectangularly shaped spacer ring 47 all held tightly assembled by cap screws 48. While not so shown, it will be understood that the mating surfaces of parts 45, 46 and 47 are suitably sealed such as by the provision of O rings or the like between the contacting metal surfaces. Ordinary gaskets are not suitable owing to the preciseness of the spacing required between the adjacent faces of end plates 45 and 46.

The highly important unitary control member of assembly 10 is a plate valve 50 having its opposite faces in close sliding contact with the adjacent faces of end plates 45 and 46, respectively. As is made clear by FIGURES 3 and 5, the peripheral edges of plate valve 50 have the same general square configuration as, but are smaller than, the inner periphery 51 of spacer ring 47, to the end that valve plate 50 has limited freedom of movement within chamber 52 of the control valve housing. However, it is pointed out and emphasized that this freedom of movement does not include relative rotary movement between valve 50 and the end plates 45 and 46.

The opposed end faces of valve plate 50 are substantially identical, the upper face of this plate being illustrated in FIGURE 5, and including a continuous annular high pressure fluid distributing groove 55 which is in communication with the high pressure fluid inlet conduit 37. This groove serves to distribute high pressure fluid through a plurality of ports 56 opening at their lower ends into an annular distributing groove 57 in the lower face of the valve plate and corresponding in the shape to groove 55.

Concentric with upper distributing groove 55 is a sealing groove 58 registerable with a similar sealing groove 59 formed in the overlying end wall of plate 45. Snugly seated in the remote ends of grooves 58 and 59 are the opposite ends of a bellows-shaped sealing ring 60 of high grade rubber or the like effective to prevent the high pressure fluid present in distributing groove 55 from passing ring 60 and entering the centrally disposed well 62 formed in upper plate 45.

Well 62 registers with a corresponding well 63 formed in the upper face of valve plate 50 and seats an assembly 64 effective to prevent the slightest rotation of valve plate 50 relative to plate 45 while leaving the valve plate free to move linearly in any direction within valve chamber 52. Assembly 64 includes an upper disc 65, an intermediate ring 66, and a lower ring 67. Upper ring 64 is seated in the bottom of well 62 and is held against rotation by a pin 69 having one end extending into close fitting engagement with the side walls of a notch 70 in ring 65. Lower ring 67 is similarly anchored within the bottom of well 63 of the valve plate. Intermediate ring 66 is provided in its opposite faces with aligned pairs of V-grooves 72, 72 spaced 90 degrees from one another circumferentially of the ring. These grooves are aligned with similarly disposed grooves 73, 73 in upper and lower rings 64 and 67, respectively, and seat therein antifriction balls 75 held captive within enlarged openings formed in cage rings 76 in accordance with well known ball bearing practice.

Figure 3:
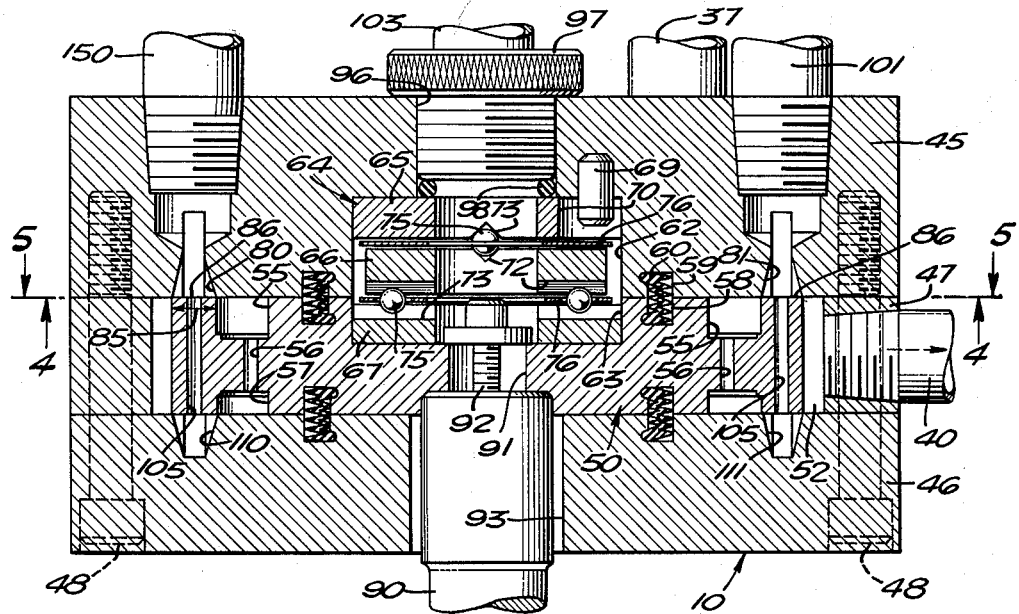
FIGURE 3 is a vertical sectional view of the master control on an enlarged scale taken along line 3—3 on FIGURE 2, the control valve being in its neutral position.

From the foregoing detailed description of device 64, it will be evident that the aligned grooves 72, 73 between ring 66 and lower ring 67 are effective to permit valve 50 to move either to the right or to the left as viewed in FIGURE 3 without, however, permitting the valve plate to move in any other direction. Likewise, it will be evident that balls 75 located between mating grooves 72 and 73 between upper ring 65 and intermediate ring 66 will permit the valve plate to move to and fro normal to the face of FIGURE 3, but will prevent movement in any other direction. The combined action of the two sets of grooves arranged 90 degrees apart will therefore be seen to permit movement of the valve plate in any linear direction parallel to its end faces without, however, permitting it to rotate in the slightest degree about the vertical axis of the control valve. Stated differently, valve plate 50 may move in any direction parallel to its faces so long as its peripheral edges remain parallel to the facing inner edges of spacer ring 47.

Figure 4:
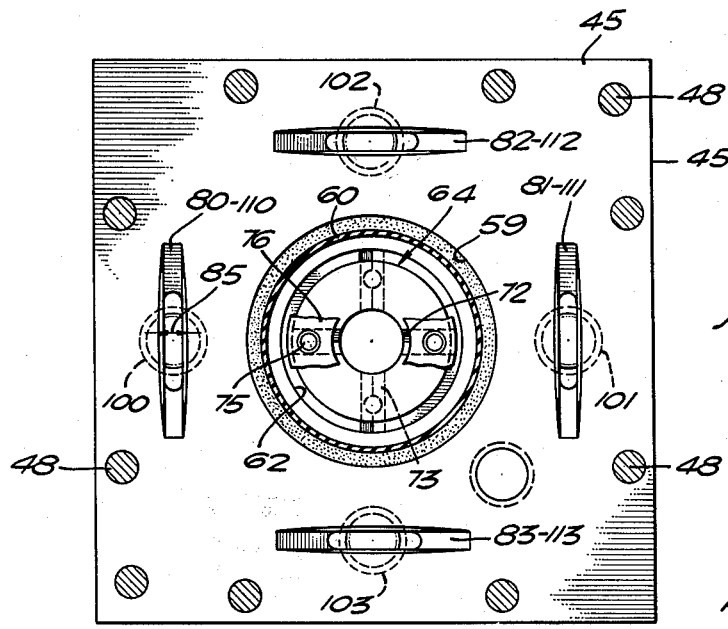
FIGURE 4 is a cross-sectional view on a reduced scale through the master control unit taken along line 4—4 on FIGURE 3.

Referring now more particularly to FIGURES 3 and 4, it will be seen that the interior face of upper housing wall 45 is provided with four elongated ports, these being arranged in two pairs, the one pair being ports 80 and 81, and the other pair ports 82, 83. It will be understood that bisecting lines passing through the center of the valve housing and through the midpoint of each pair of ports lie at right angles to one another to the end that the ports are symmetrically spaced circumferentially as well as radially from the neutral axis of plate 50.

Of importance is the fact that the opposite longer sides of each port 80, 81, 82, 83 are bowed away from one another along large diameter arcs of the nature indicated in FIGURE 4 and, by reason of this curvature the ports are effective to feather the flow of fluid through the ports and enabling the slave cylinders to start moving and to cease moving at a gradually changing rate thereby avoiding hunting and overrunning so characteristic of prior servo control valves. Stated differently, if the ports are provided with straight opposite edges the opening of the valve member one thousandth of an inch would permit flow to occur past the full length of the port. However, if the longer side of the port is bowed in the manner illustrated in FIGURE 4, the opening of the port by a thousandth of an inch permits a relatively small flow in comparison to that mentioned above.

The maximum width of each port is represented by the double headed arrow 85 and it is pointed out and emphasized that this width corresponds exactly with the width of land 86 extending along each edge of valve plate 50. The side wall of land 86 is formed in part by the outer side wall of plate 50 and in part by notches 87 formed in the outer side wall of the annular distributing groove 55. It is further pointed out that land 86 is so accurately dimensioned relative to ports 80, 81, 82, 83 as to underlie and prevent any flow through these ports only when valve plate 50 is precisely in its neutral position centrally of chamber 52. If valve 50 is moved ever so slightly away from this neutral position, then at least one edge of one pair of ports will be exposed. Thus, if valve 50 moves only to the right or to the left as viewed in FIGURE 5, it will be understood that only ports 80 and 81 are open and that ports 82, 83 remain closed. On the other hand, if plate 50 moves only up and down parallel to the longer axes of ports 80 and 81, only ports 82 and 83 will be opened. However, if the valve plate moves in any other direction from neutral than the two directions just mentioned, it will be apparent that all four ports will be opened to some extent and in an amount depending upon the direction of movement of the valve.

The means for shifting valve 50 toward and away from its normal neutral position comprises an actuator or stylus 90 rigidly secured within a central opening 91 of valve plate 50, as by a cap screw and washer assembly 92. Stylus 90 opens through an enlarged opening 93 formed centrally of lower housing plate 46 and is adapted to seat detachably at its lower end a follower wheel 95 having the same outer dimensions as milling cutter 21. Access may be had to the anti-rotation assembly 64 for inspection and the application of lubricant through an access opening 96 threadedly seating a bushing 97 bearing against a gasket ring 98 interposed between the ends of the bushing and ring 65 of assembly 64.

Referring more particularly to FIGURES 1 and 3, it is pointed out that that port 80 is connected to the outer end of slave cylinder 18 by high pressure hose 100, whereas port 81 is connected to the inner end of this slave cylinder by hose 101. Likewise, port 82 is connected to the inner end of slave cylinder 24 by hose 102 and port 83 is connected to the outer end of this cylinder by hose 103, all connections being so made that movement of stylus 90, 95 against master pattern 15' effects a corresponding movement of cutting tool 21 relative to a corresponding portion of workpiece 15.

It remains to be pointed out that bottom plate 46 is formed with ports 110, 111, 112 and 113 corresponding in position, shape, size and disposition with ports 80, 81, 82 and 83, respectively, and that the inlets to these ports are exactly covered by a land formed on the lower face of valve 50 identical with land 86 on the upper surface. Furthermore, these lands are interconnected by pressure equalizing passages 105 to the end that the pressure effective on the land on the lower face of valve plate 50 will correspond to that existing at any time on the corresponding portions of the valve plate. Furthermore and for the same reason, the pressure within ports 80, 81, 82 and 83 will be identical with that in lower ports 110, 111, 112 and 113, respectively. It will therefore be clear that the pressure acting on the opposite faces of the valve at any time will be due in part to the pressure of the fluid within supply conduit 37 and in part to the pressure of the fluid in ports 80, 81, 82 and 83, this pressure depending on whether the valve is in its neutral position or in some open position. Irrespective of which position the valve is in, equalizing passages 56 and 105 will assure that the total pressure acting on one face of the plate is equal to the total pressure acting on the other face. Accordingly, it may be said that the valve plate floats between films of equal pressure fluid present on the opposite faces of the valve and between these faces and the juxtaposed surfaces of the housing end walls.

The operation of the described servo control system will be readily apparent from the foregoing detailed description of the construction and function of the several components. Owing to the equalization of the pressure acting on the opposite surfaces of the master valve member 50, it will be evident that the slightest pressure applied laterally against stylus spindle 90 will be effective to shift the valve relative to its neutral position. Let it be assumed that the stylus is moved directly to the right from its neutral position as viewed in FIGURE 3. In these circumstances ports 82 and 83 will remain closed and the inner edge of port 81 will be opened to the high pressure fluid supply within distributing groove 55 thereby admitting pressurized fluid to port 81 and to hose 101 connected to the inner end of slave cylinder 18 thereby effecting the movement of cutter 21 in the same direction as the stylus. At the same time, the outer edge of land 86 moves inwardly past the outer edge of port 80 allowing fluid from the outer end of slave cylinder 18 to flow through hose 100 and to be discharged into the return fluid passageway surrounding valve 50. This fluid enters return conduit 40 and flows back to storage tank 33.

From the foregoing, it will be readily apparent that movement of stylus 90 in some other direction will shift valve 50 in a manner to partially open one port of each pair allowing fluid to flow to both slave cylinders 18 and 24. The flow to each will correspond to the relative openings of the two inlet ports thereby assuring the desired relative degree of movement of milling cutter 21 to keep it exactly coordinate with the movement of stylus spindle 90. Since the mode of operation of the described structure is so well known to those skilled in this art, further detailed description is thought unnecessary.

Referring now to FIGURES 6 and 7, there is shown a second preferred embodiment of the invention generally similar to that just described. In view of the substantial identity of the components in the two embodiments, the corresponding parts of the second embodiment have been identified with the same reference characters distinguished by the addition of a prime. The essential difference between the two embodiments is that ports 110', 111', 112', 113' of the second embodiment are provided with outlet passages connected by hoses 100", 101", 102", 103", respectively, with slave cylinders 18" and 24", to the end that slave follower device 11" may be controlled simultaneously and in harmony with slave follower device 11' and with the single master control assembly 10'.

The only other change required to accomplish the foregoing objective is the elimination of the pressure equalizing ports 105 of the first described embodiment thereby assuring that each set of flow control ports in end plates 45', 46', respectively, will be completely divorced from one another. The respective slave follower devices 11', 11", are thus seen to be connected to the common high pressure source of fluid, namely, distributing groove 55' and the high pressure supply conduit 37'; nevertheless both slave follower devices are otherwise completely isolated from communication with fluid pressure conditions in other parts of the system. In consequence, the movement of stylus 95' about the entire periphery of master pattern 15' is effective to produce multiple duplicate parts identical in all respects with the master pattern. Moreover, this result is accomplished with a single unitary valve member 10'.

It is pointed out and emphasized that the pressurized fluid can be supplied to the ring-like chambers 52 and 52' surrounding the valve plate and that the return fluid can be returned to tank 33 and 33' from collecting grooves 55 and 55' in the valve plate, the only change required being to shift the fluid flow conduits appropriately. The master control valve as well as the system as a whole, functions in the same manner. Certain advantages are to be enjoyed by use of the alternate mode of controlling fluid flow however. For example, as will be appreciated, it is impossible for fluid under pressure to reach the fluid sealing bellows 60, 60' and assurance is thereby provided that the opposite surfaces of these flexible sealing members are never subjected to a pressure differential in the normal operation of the valve. Furthermore, it will be apparent that the pressures acting on the opposite faces of the plate valve are much smaller. Accordingly, it will be recognized that both modes of connecting the master control to the slave assemblies may be employed, as desired, and that both are to be deemed as within the scope of the claims made to this invention.

While the particular hydraulic servo control mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination, a servo master control valve for use in precise control of a slave follower device supported for movement in harmony with and under the direct control of the master control, said master control valve comprising a main housing having opposed end walls, a master valve element having opposed faces in close sliding contact with said end walls, an actuating element secured centrally to said valve element and operable to move the same through a limited distance in any direction parallel to said end walls from a nuetral position, resilient fluid sealing means surrounding said actuating element and cooperating with said housing and with said valve element to permit lateral non-axial movement of said control element without permitting escape of fluid past said fluid sealing means, pairs of fluid ports opening through said end walls and positioned to be controlled by the movement of said valve element, said pairs of ports being positioned to be fully closed only when said valve element is precisely in said neutral position and to permit flow through both ports of at least one pair of ports in all other positions of said valve element, means for supplying fluid under pressure to said housing for flow outwardly through certain of said ports depending on the direction of movement of said valve element from its neutral position, means for conducting return flow fluid from said housing, and means for substantially balancing the fluid pressure on the opposite faces of said master valve element in all operating positions thereof.

2. The combination defined in claim 1 characterized in that said resilient fluid sealing means comprises a pair of annular sealing bellows between the end walls of said housing and the adjacent face portions of said master valve element operable to prevent the fluid being controlled by said valve element from escaping into the central area of said valve housing.

3. The combination defined in claim 1 characterized in that said resilient fluid sealing means comprises a pair of annular resilient bellows one located on either side of said master valve element with one end sealed against the central area of said valve element and the other end sealed against the central area of the adjacent housing end wall, said bellows being cooperable to prevent the escape of fluid from the ported portion of said housing into the central portion thereof.

4. In combination, a plurality of independent slave follower devices each having a follower element arranged to be moved anywhere within a predetermined plane under the control of a pair of hydraulically controlled actuators each operable to and fro at right angles to one another in said predetermined plane, a single master control valve assembly hydraulically connected by pressurized fluid hoses to the hydraulic actuators of each of said slave follower devices, means providing a single source of pressurized hydraulic fluid to said master control valve, and said master control valve including means for controlling each of said slave follower devices in precise unison with one another and with said master control valve by pressurized fluid received from said single pressurized fluid source.

5. The combination defined in claim 4 characterized in that the means within said master control assembly for controlling fluid flow to said slave follower devices comprises a common control valve means movable as a unit toward and away from a neutral position thereof in which neutral position there is no fluid flow to or from any of the hydraulic actuators for any of said slave follower devices.

6. The combination defined in claim 4 characterized in that the fluid flow control means in said master control assembly includes a unitary valve member constrained for movement in a single plane parallel to the plane of movement of the hydraulic actuators for said slave follower devices.

7. The combination defined in claim 6 characterized in that said unitary valve member comprises a single plate valve member, sets of flow control ports for separate ones of said slave follower devices disposed on the opposite faces of said plate valve member and connected to the hydraulic actuators for said devices by flow passages out of communication with one another.

8. The combination defined in claim 6 characterized in the provision of antifriction bearing means in said master control assembly for permitting said unitary valve member to move in any direction within a plane parallel to the predetermined plane of movement of said hydraulic actuators for said slave follower devices.

9. The combination defined in claim 4 characterized in the provision of an actuating control member for actuating said master control assembly, said control member being rigidly secured to said means for controlling the flow of pressurized fluid to and from the actuators for said slave follower devices.

10. A master control assembly operable to control a plurality of slave follower devices in precise unison from a common source of pressurized hydraulic fluid, said assembly comprising a housing having a main control chamber having end walls in close fitting sliding contact with control valve means, each of said end walls having sets of four flow control ports spaced equi-distantly from one another and from a focal point centrally of said chamber, said valve means being operable fully to close each of said ports when precisely in the neutral position thereof and effective to permit flow through at least a plurality of the ports in each of said end walls in any other position thereof, flow passages leading from each of said ports to the exterior of said housing, and flow passage means for making pressurized hydraulic fluid from a common source available to any port opened to said pressurized fluid upon movement of said valve means away from its neutral position.

11. A master control assembly as defined in claim 10 characterized in the provision of means within said housing for holding said valve against rotary movement and for providing for free movement of the same linearly in any direction within a plane parallel to said end walls.

12. A two-dimensional tracer control system for controlling identical milling operations simultaneously on two similar machine tools in accordance with control information supplied from a master pattern secured to the carriage of one of said machine tools, said control system including slave follower devices adapted to be mounted on separate ones of said machine tools and each including a hydraulically controlled actuator operable to move a power driven milling cutter in a common plane and in a path at right angles to the path of movement of another hydraulic actuator of the respective device and in faithful unison with the movement of the control stylus of the master control unit, a rigidly supported master control unit having a control stylus adapted to be advanced in contact with a master pattern, a unitary control valve movably supported in said master control unit for movement in a plane parallel to said common plane of movement of each of said slave follower devices, and means connecting a common pressurized source of hydraulic fluid to said master control unit and to each of said slave follower devices whereby movement of said unitary control valve is effective to cause said milling cutters to move in precise unison with said control stylus.

13. A tracer control system as defined in claim 12 characterized in the provision of means for conducting pressurized fluid from said common source to the opposite faces of said unitary control valve thereby subjecting both faces to the same pressure.

14. A tracer control system as defined in claim 12 characterized in the provision of means between the opposite faces of said unitary control valve and the juxtaposed interior surfaces of said master control unit for sealing the central area of said unitary control valve from access by said pressurized fluid.

15. A tracer control system as defined in claim 14 characterized in that said control stylus includes means operatively connecting the same to said unitary control valve in an area circumscribed by said sealing means.

16. A tracer control system as defined in claim 12 characterized in the provision of means for preventing relative rotary movement between said unitary control valve and said master control unit while permitting linear movement of said control valve in any direction within the plane of movement thereof.

17. A hydraulically energized remote control system for simultaneously controlling in unison a plurality of slave follower devices from a single master control unit and a common source of pressurized hydraulic fluid, said system having a control unit housing formed with a chamber having closely spaced end walls each ported similarly and connected through fluid conveying conduits with said slave follower devices, a single control valve having a close sliding fit on the opposite faces thereof with said ported end walls and shaped barely to cut off all flow through said ports when in the neutral position thereof, and means for subjecting the opposite faces of said control valve to said pressurized fluid whereby to float said control valve on films of pressurized fluid, said last named means including means to direct said pressurized fluid simultaneously through similarly located ports on the opposite faces of said control valve depending on the direction of movement of said valve from the neutral position thereof.

References Cited in the file of this patent

UNITED STATES PATENTS

| | | |
|---|---|---|
| 1,834,922 | Abercrombie | Dec. 8, 1931 |
| 1,978,389 | Sassen et al. | Oct. 23, 1934 |
| 2,111,332 | Roehm | Mar. 15, 1938 |
| 2,331,817 | Turchan | Oct. 12, 1943 |
| 2,386,219 | Lauck | Oct. 9, 1945 |
| 2,448,649 | Adams | Sept. 7, 1948 |
| 2,827,924 | Towler | Mar. 25, 1958 |
| 2,835,466 | Rosebrook | May 20, 1958 |
| 2,872,148 | Humes | Feb. 3, 1959 |
| 2,911,182 | Clarke | Nov. 3, 1959 |